United States Patent [19]
Folta

[11] Patent Number: 5,257,561
[45] Date of Patent: Nov. 2, 1993

[54] TIRE HOLDING FIXTURE FOR TIRE PROCESSING MACHINE

[75] Inventor: Edward J. Folta, Anchorville, Mich.

[73] Assignee: Illinois Tool Works Inc., Glenview, Ill.

[21] Appl. No.: 881,195

[22] Filed: May 11, 1992

[51] Int. Cl.$^5$ .......................................... G01M 17/02
[52] U.S. Cl. ....................................... 82/165; 82/104; 73/146; 157/14
[58] Field of Search .................... 73/146; 82/104, 142, 82/165; 157/14, 16, 20, 21

[56] References Cited

U.S. PATENT DOCUMENTS

| | | | |
|---|---|---|---|
| 4,023,407 | 5/1977 | Vanderzee | 73/146 |
| 4,852,398 | 8/1989 | Cargould et al. | 73/146 |
| 5,074,347 | 12/1991 | Corghi | 157/14 |

FOREIGN PATENT DOCUMENTS

| | | | |
|---|---|---|---|
| 0446137 | 9/1991 | European Pat. Off. | 73/146 |
| 0206223 | 1/1984 | Fed. Rep. of Germany | 73/146 |

*Primary Examiner*—Mark Rosenbaum
*Assistant Examiner*—John M. Husar
*Attorney, Agent, or Firm*—Schwartz & Weinrieb

[57] ABSTRACT

A tire holding fixture for holding a tire for processing by a tire processing machine comprises first and second wheel half support assemblies. One of the assemblies is shiftable between an open position for permitting insertion of a tire between the assemblies, and a closed position for holding said tire between the assemblies. The first assembly includes a hollow substantially cylindrical portion having an inner surface, and the second assembly includes a spindle, having an outer surface, insertable into said hollow cylindrical portion. A plurality of detents is disposed on the inner surface of the hollow cylindrical position. A plurality of projections shiftable between a detent engaging position and a detent releasing position is disposed on the outer surface of the spindle. The projections are engagable with the detents when the outer surface of the spindle is disposed concentrically with respect to the inner surface for releasably locking the assemblies together for holding a tire for processing therebetween.

20 Claims, 5 Drawing Sheets

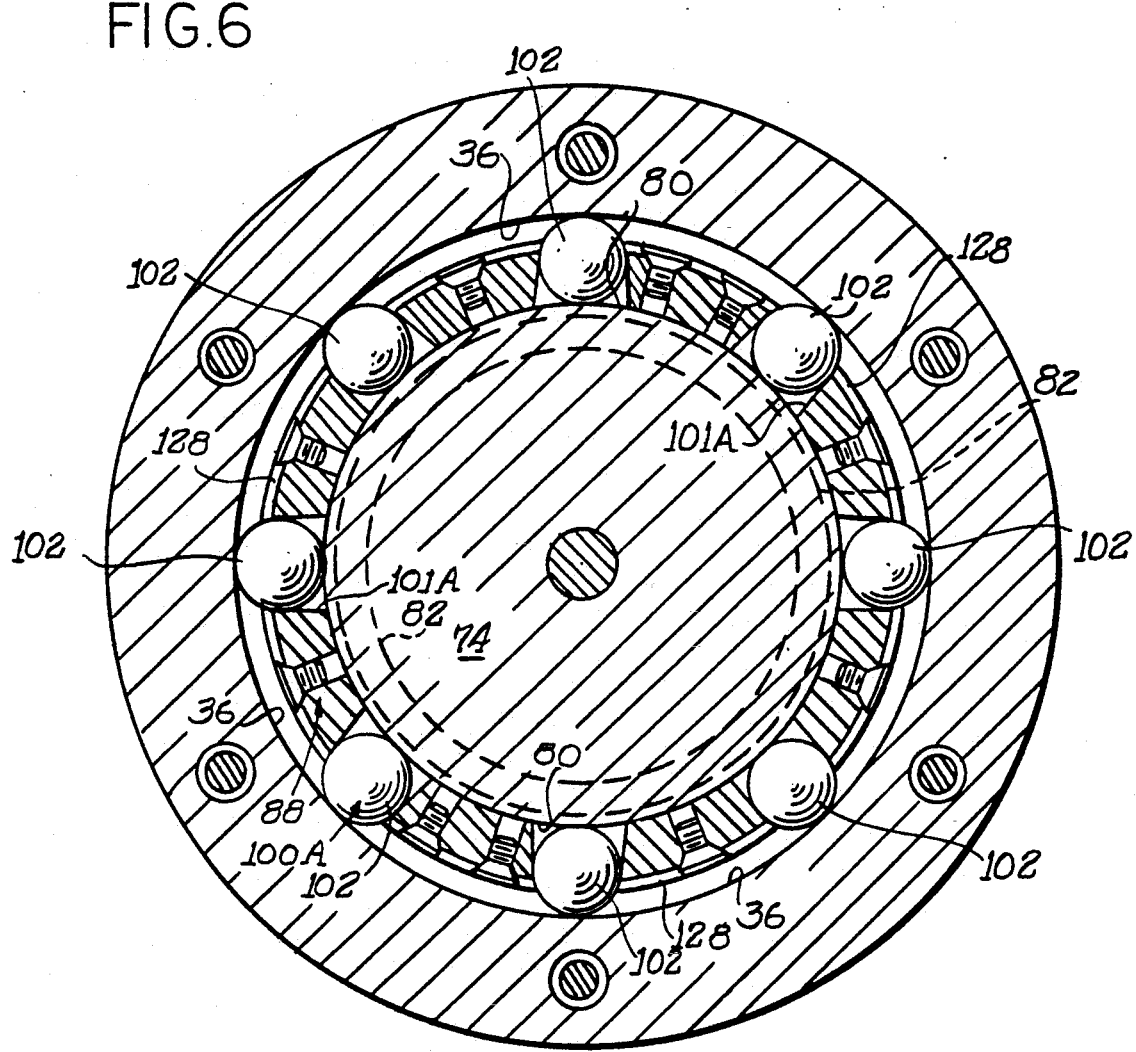

TIRE HOLDING FIXTURE FOR TIRE PROCESSING MACHINE

FIELD OF THE INVENTION

The present invention relates generally to a tire processing machine for balancing, grinding and/or grading production tires for automobiles, wherein the machine has a novel tire holding fixture. More specifically, the invention relates to a novel automatic quick release locking means for a tire holding fixture.

BACKGROUND OF THE INVENTION

During the manufacture of production tires for automobiles, or for any other vehicle for that matter, each freshly molded tire must be processed, that is, balanced, ground and graded, to put that tire in a final, marketable condition. To do this processing, each tire is mounted on a tire holding fixture operatively associated with a particular tire processing machine.

The general construction of tire holding fixtures and of tire processing machines is well known in the relevant art, as is evident from the co-pending U.S. patent application Ser. No. 07/645,743, filed on Jan. 5, 1991, and the references cited therein. The co-pending patent application is assigned to the assignee of the present invention, and the disclosure thereof is incorporated herein by reference. It is to be noted, however, that while the co-pending application discloses a tire holding fixture having particular utility with heavy weight truck tires, the present invention is intended to be utilized with automobile tires.

Given the continuing American "love affair" with the automobile, it is desirable to supply the relevant markets with ample quantities of spare or replacement parts for the autos. One of the automobile parts that is replaced relatively often is the tires. Accordingly, it is desirable for certain retailers to have an adequate supply of tires on hand at all times. Tire manufacturers have to meet this retailer demand in order to preserve their market share. Therefore, tire manufacturers need to produce a large amount of tires in a small amount of time.

As discussed above, before the freshly molded tires are ready for retail customers, the tires must be appropriately processed. Processing of the tires takes time. Specifically, each tire must, in turn, be mounted on a tire fixture which holds the tire during processing. The fixtures generally comprise two shiftable, simulated wheel halves which mimic the holding properties of an actual wheel when shifted into a closed position. These fixtures must hold the tire quite firmly because the tires are often inflated to a desired pressure and rotated at high speeds during processing. After processing, the wheel halves are then shifted into an open position so as to facilitate tire removal therefrom.

In order to firmly hold the tires on the fixtures of the prior art, somewhat elaborate and complicated locking means is provided to hold the simulated wheel halves together in the closed position. While these locking means are often effective, they often require significant time to lock and unlock. This significant set-up time period results in lost revenues to the tire manufacturer because the time spent in set-up could be more profitably spent processing tires for retail sale. In addition, the locking means should be able to maintain the simulated wheel halves in alignment to provide for proper processing of the tires. Accordingly, additional time may have to be spent to insure that the prior art locking means is maintaining that alignment.

The present invention is intended to solve some, if not all, of the problems presented by tire holding fixtures, and the associated locking means, of the prior art. The invention provides an automatic quick release locking means for automatically holding the simulated wheel halves together which can maintain the halves in alignment within 0.003 inches, thereby reducing or eliminating set-up time and alignment checking time. This can result in greater revenues to a tire manufacturer.

OBJECTS OF THE INVENTION

A general object of the present invention is to provide a novel tire processing machine having particular utility with balancing, grinding, and grading production tires for automobiles.

A more specific object of the invention is to provide a novel tire holding fixture for use with a tire processing machine.

Another object of the present invention is to provide a tire holding fixture having novelly constructed, variable locking means for firmly holding simulated wheel halves of the fixture together a variable distance apart for accommodating production tires of varying widths.

An additional object of the invention is to provide a tire holding fixture having novelly constructed locking means for holding simulated wheel halves in alignment within 0.003 inches or better.

A further object of the present invention is to provide novel locking means for a tire holding fixture whose accuracy can assist in reducing machine set-up time.

Yet another object of the invention is to provide a tire processing machine having a tire holding fixture including novel quick release locking means.

An additional object of the present invention is to provide a novelly constructed quick release locking means for a tire processing machine which allows the machine to be operated automatically.

SUMMARY OF THE INVENTION

A tire processing machine for balancing, grading and grinding production tires having a tire holding fixture, constructed according to the teachings of the present invention, comprises first and second wheel half support assemblies. One of the assemblies is shiftable between an open position for permitting insertion of a tire, and a closed position for holding said tire. The first assembly includes a hollow substantially cylindrical member having an inner surface of a predetermined diameter, and the second assembly includes a spindle having an outer surface insertable into said inner surface. A plurality of detents is disposed on the inner surface. A plurality of projections shiftable between a detent engaging position and a detent releasing position is disposed on the outer surface. The projections are engagable with the detents when the spindle is inserted into the cylindrical member for releasably locking the assemblies together for holding a tire for processing.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements throughout the several views, and wherein

FIG. 6 is a partial sectional view, taken along line 6—6 of FIG. 4, illustrating the construction of a portion of the quick-release locking means.

DETAILED DESCRIPTION OF THE PREFERRED EMBODIMENT

Figure 1:
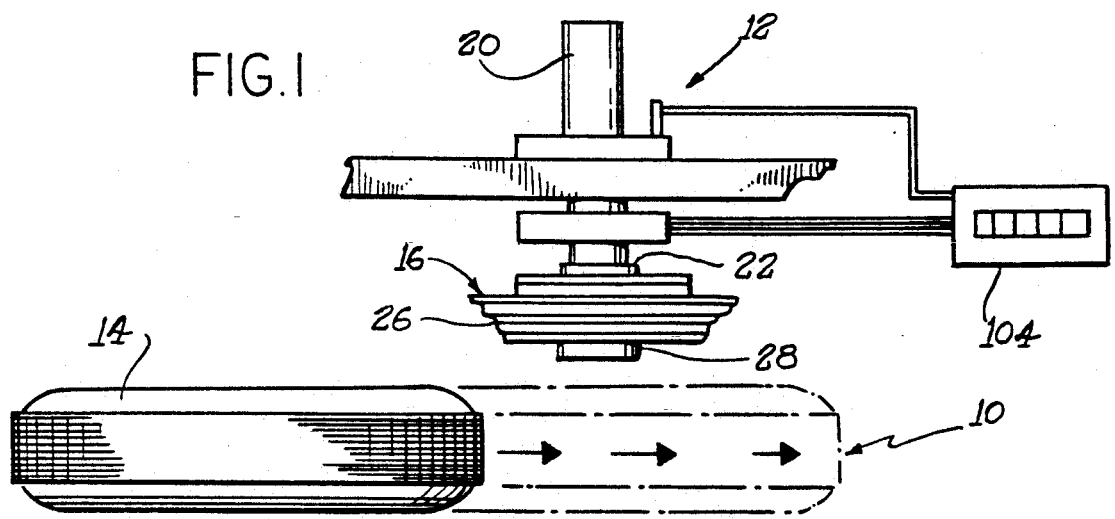
FIG. 1 is a partially schematic elevational view of a tire processing machine having a tire holding fixture, constructed according to the teachings of the present invention, with the holding fixture shown in an open position for accepting a tire for processing.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring generally to FIG. 1, a tire holding fixture 10 including quick release locking means 11, constructed according to the teachings of the present invention, is disclosed. The tire holding fixture 10 is just one element of a larger, more complex tire processing machine 12, partially shown in FIGS. 1 and 2. The tire processing machine 12 can perform many, various processes upon a production tire 14, such as balancing, grading, and grinding. The construction and function of the tire processing machine 12 are well known in the art. The general structure and functionality of tire holding fixtures are disclosed in detail in the above-referenced co-pending patent application. Accordingly, the fixture 10 will be discussed in detail only as is necessary to provide an understanding of the locking means 11.

Figure 3:
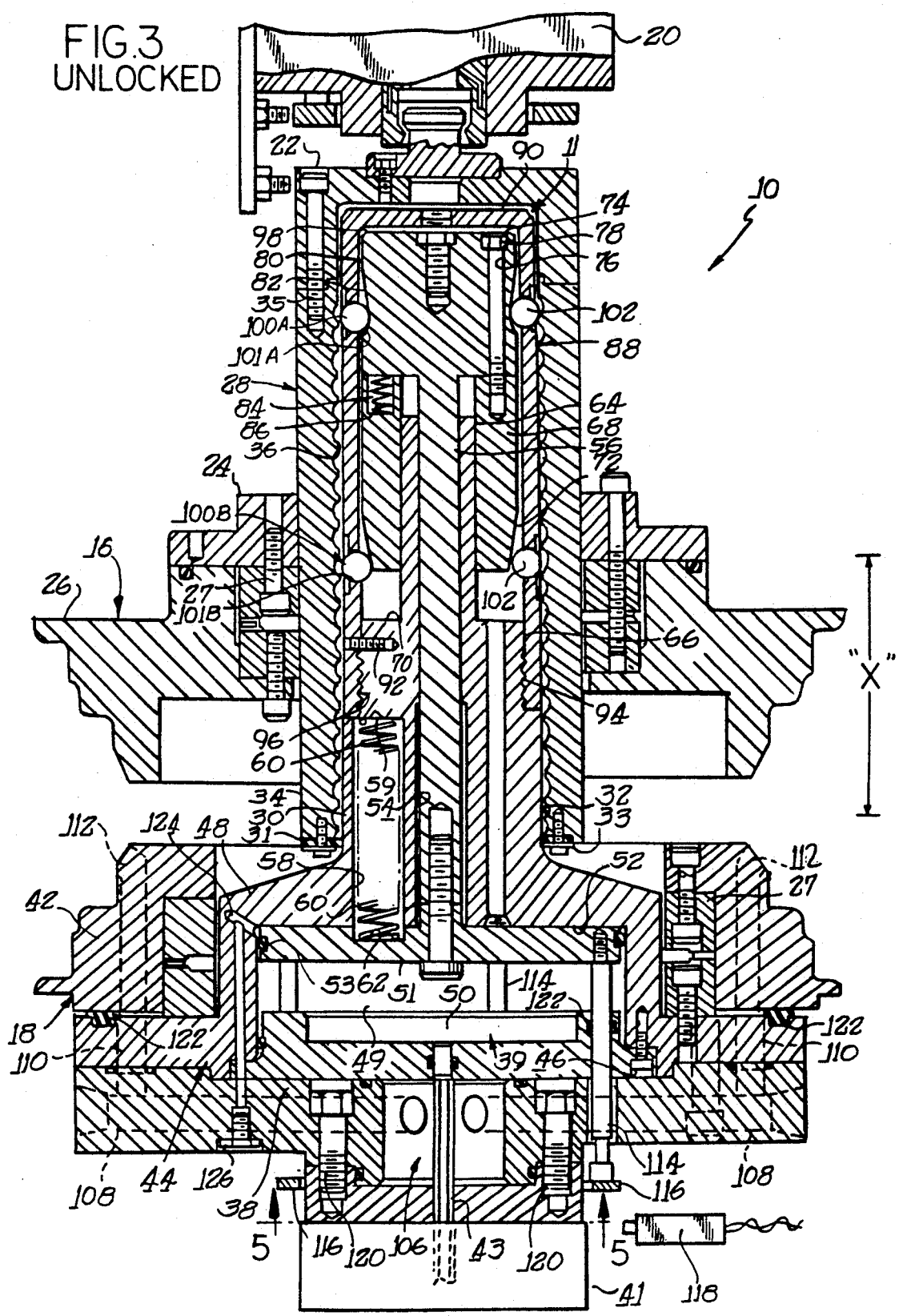
FIG. 3 is an enlarged partial sectional view of the tire holding fixture FIG. 1 with locking means shifted into an unlocking position.
Figure 4:
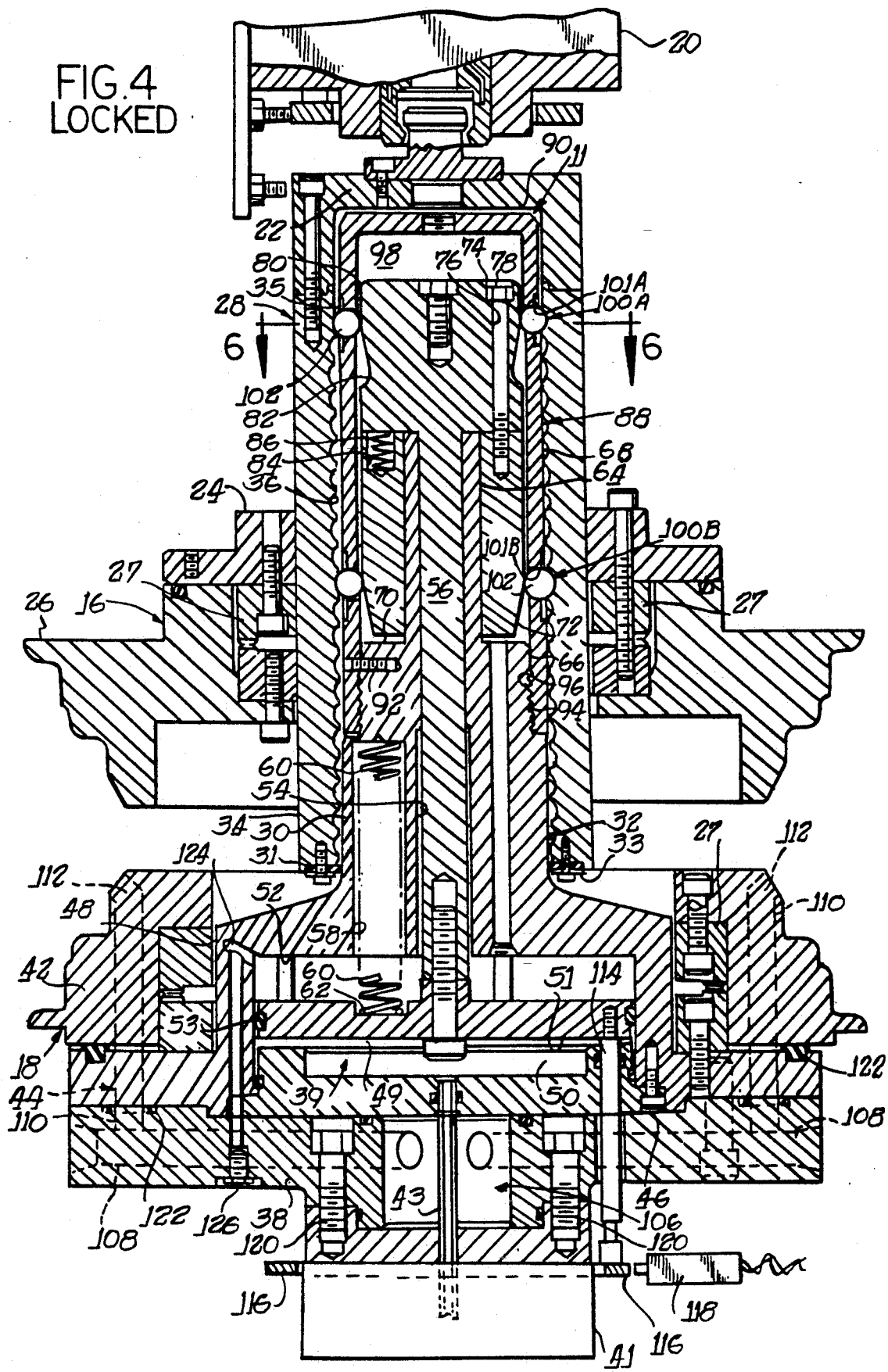
FIG. 4 is a partially sectioned view of the tire holding fixture of FIG. 3 with the locking means shifted into a locking position.

Drawing attention to FIGS. 3 and 4, the construction of the fixture 10 and the locking means 11 is illustrated in detail. The fixture 10 generally comprises a first wheel half support assembly 16 and a second wheel half support assembly 18 which mimic the structure and holding properties of an actual wheel when properly joined. The assemblies 16 and 18 each include components of the locking means 11 for facilitating locking and alignment of the assemblies 16 and 18 to form a simulated wheel.

Figure 2:
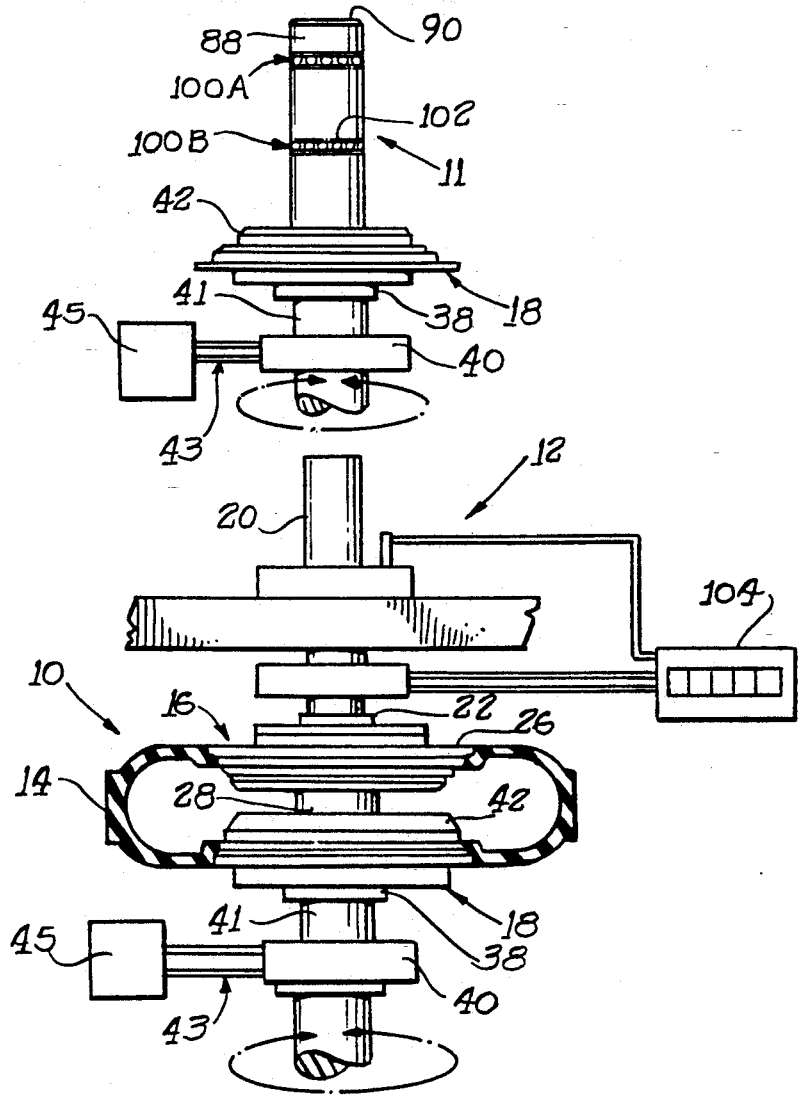
FIG. 2 is a view similar to that of FIG. 1, illustrating the tire holding fixture of FIG. 1 in a closed position holding a tire, shown in section, for processing.

The first wheel assembly 16 is attached to a piston 20 for shifting the assembly 16 between an open position, shown in FIG. 1, for allowing placement and removal of a tire 14 from the fixture 10, and a closed position, shown in FIG. 2, for holding a tire 14 for processing. The piston 20 is capable of variably shifting the assembly 16 with respect to the assembly 18 to allow the fixture 10 to hold tires 14 of varying widths, as will be discussed further hereinafter. The piston 20 also allows the assembly 16 to rotate conjointly with the assembly 18, as will be discussed in greater detail hereinbelow, for processing the tire 14.

The assembly 16, as illustrated in FIGS. 3 and 4, comprises a base portion or adapter 22 connected to the piston 20, a flange 24 for connectively supporting a first simulated annular wheel half 26, and a hollow cylindrical member 28 connected to and projecting substantially axially from the base 22. The wheel half 26 is releasably connected to the flange 24 by a quick-connect mechanism 27, disclosed in the above-referenced co-pending application, which reduces simulated wheel change time and also locates the half 26 on center within 0.0005 inches. The cylindrical member 28 is of dimensions sufficient for slidably accepting a spindle or stub shaft 30 which comprises an element of the second wheel assembly 18.

As stated above, the member 28 is hollow having an inner surface 32 of a first diameter and an outer surface 34 of a second, larger diameter. The outer diameter of the spindle 30 is such that the spindle 30 can be inserted into the member 28 when the assembly 16 is shifted into the closed position, as shown in FIGS. 2 through 4. The assembly 16 is shiftable with respect to the assembly 18. It is therefore desirable to keep the spindle 30 clean so that contaminants will not be able to harm the functionality of the fixture 10 and the machine 14. Accordingly, an annular elastomeric ring 31 is disposed on an open end 33 of the member 28. When the spindle 30 is inserted into the member 28, the ring 31 sweeps contaminants away from the surface of the spindle 30.

In addition, a portion of the locking means 11 is disposed on the surface 32 for facilitating locking and alignment of the assemblies 16 and 18 for processing a tire 14. The portion of the locking means 11 located on the inner surface 32 is in the form of a plurality of annular recesses or detents 36 relieved into the inner surface 32 towards the outer surface 34. Each of the annular detents 36 is radiused for accepting a portion of the locking means 11 disposed on the assembly 18, as will be discussed further hereinbelow. The annular detents 36 are located along a length of the member 28 from a point proximate the open end 33 thereof to a point, indicated at 35, between the base portion 22 and the flange 24.

Accordingly, the detents 36 extend axially along the inner surface 32 of member 28 a distance sufficient for allowing the tire fixture 10 to releasably hold tires 14 of varying widths. Specifically, the assembly 16 can shift within a range, indicated by "X" in FIG. 3, to accept tires 14 of different widths, while still being interlockable with the assembly 18 by the means 11. In the preferred embodiment illustrated in the FIGS., the fixture 10 can accommodate tires 14 having a five inch width variation.

The assembly 18 comprises a base assembly 38 attachable to a rotatable spindle 41 of a machine 40, as shown in FIGS. 1 through 4, by suitable bolts 120, two of which are shown in FIGS. 3 and 4, for rotating the fixture 10 and a tire 14 held thereby for processing. The spindle 41 is of suitable construction for joining the assembly 18 to the machine 40, and also forms a rotatable air coupling therebetween for providing the pneumatic elements of the fixture 10 with an appropriate fluid. A second simulated annular wheel half 42, similar to the half 26, is releasably attached to the base assembly 38 by another quick-connect mechanism 27. Accordingly, when the assembly 16 is shifted into the closed position, as shown in FIGS. 2 through 4, the halves 26 and 42 mimic an actual wheel for retaining the tire 14, illustrated in section in FIG. 2, during processing.

Figure 5:
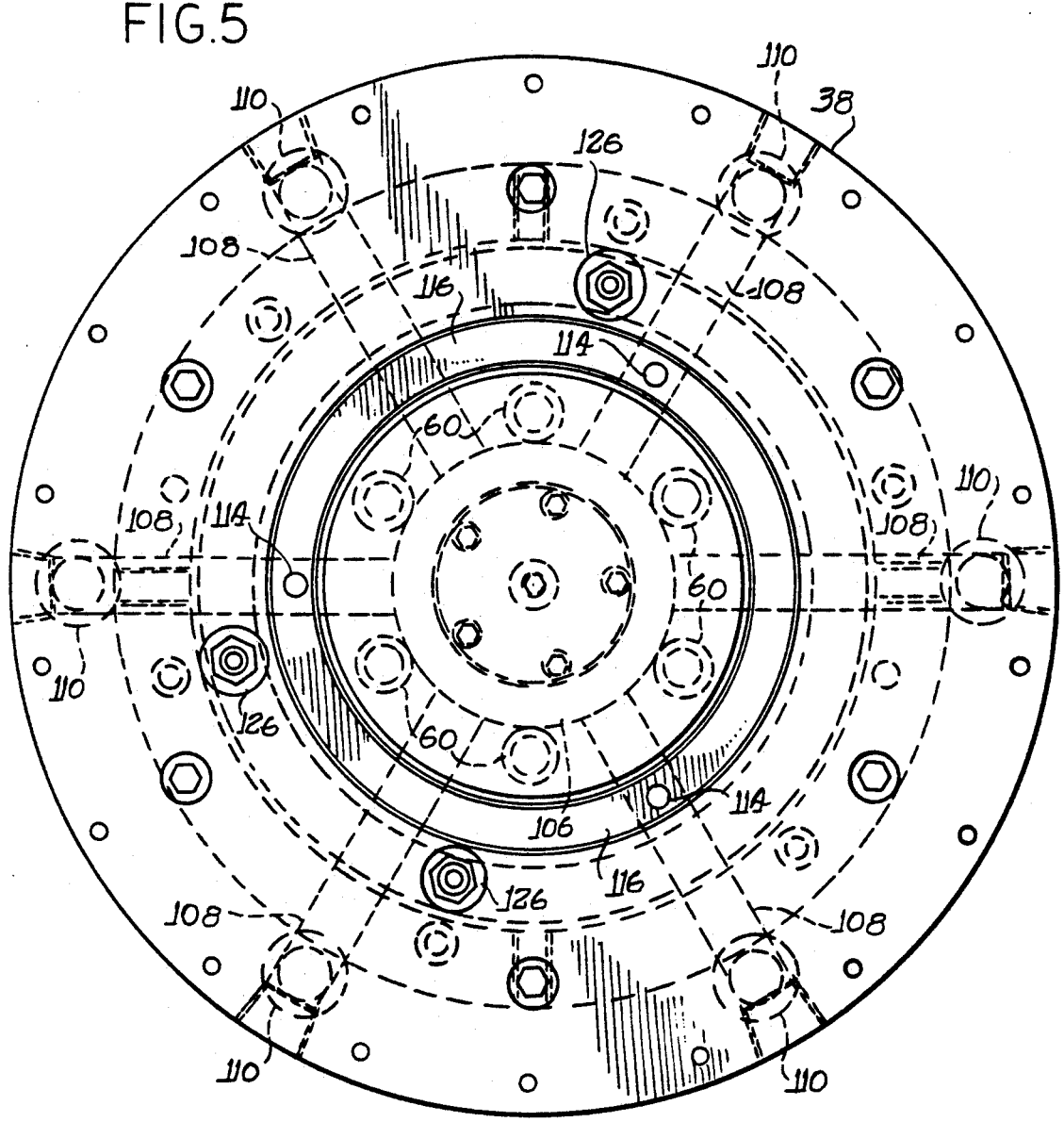
FIG. 5 is a partial bottom end view, taken along line 5—5 of FIG. 3, showing the construction thereof.

To facilitate proper processing of the tire 14, the tire 14 is inflated to a suitable pressure. To facilitate this inflation, inflation means comprising an air chamber 106, shown in FIGS. 3 and 4, is provided centrally in the base assembly 38 for accepting compressed air supplied through the spindle 41. A plurality of radial bores 108, preferably six in number as shown in FIG. 5, are connected to and extend outwardly from the chamber 106 within the assembly 38, thereby permitting distribution of the compressed air contained in the chamber 106. Ends of the radial bores 108 opposite to the ends thereof connected to the chamber 106 are connected to axial bores 110 which extend upwardly from the bores 108 through the assembly 38 and the simulated wheel half 42 as shown in FIGS. 3 and 4. The bores 110 include openings 112, two of which are shown in FIGS. 3 and 4 for clarity, in the simulated wheel half 42 so that compressed air can pass from the bores 108 and 110 into the interior of the tire 14. Accordingly, the bores 108 and 110 form a compressed air transport system for directing compressed air from the chamber 106 into the tire 14, thereby inflating it for processing.

The base assembly 38 includes a pneumatic cylinder 39 comprising an enlarged head or cylindrical section 48 providing an air chamber 49 having its lower end closed by an end plate 50. A piston disc or plate 51 is axially shiftable within the chamber 49. The significance of the pneumatic cylinder 39 will become more clear hereinafter. The base assembly 38 also includes a conduit 43 for delivering compressed air, or other suitable fluid, to the air chamber or cylinder 39 from an appropriate source 45, illustrated diagrammatically in FIGS. 1 and 2. The cylinder section 48 terminates in a projecting member or flange 44 attached to the base plate 50 by suitable bolts 46 for insuring conjoint rotation of the base plate 50 and the spindle 30.

The cylindrical portion 48 has an outer diameter somewhat larger than a corresponding outer diameter of the spindle 30 and the cylindrical member 28. The piston or plate 51 is shiftable between a locking position, shown in FIG. 4, and an unlocking position, shown in FIG. 3, and a top surface of the chamber 49 defines a positive stop member 52, the significance of which will become more clear later. The piston 51 moves or shifts in response to air pressure built up in the central recess or air chamber 49. To seal the air chamber 49, the piston 51 includes an annular gasket or O-ring 53 for sealing engagement between the piston 51 and a wall of the chamber 49. It is to be noted that a plurality of O-rings, designated by character 122, are provided in the assembly 38 for insuring proper pneumatic operation of the fixture 10. To facilitate shifting of the piston 51, a bore 124 is provided connected to the chamber 49 proximate to the stop member 52 for appropriately venting the chamber 49. The bore 124 is connected to a vent 126, shown in FIGS. 3 through 5, located at the bottom of the assembly 38 for allowing air to exit the assembly 38. Preferably, three such vents 126 are provided, as indicated in FIG. 5.

The spindle 30 has an axial bore 54 therethrough of dimensions sufficient for accepting a piston rod 56 connected to the piston 51. The bore 54 allows for axial shifting of the rod 56 in response to shifting of the piston 51. As will be discussed further hereinafter, the shifting of the piston 51 and the rod 56 actuates the means 11.

The piston 51 is connected by a suitable bolt 114 to an annular ring 116, illustrated in FIGS. 3 through 5. In a preferred embodiment of the invention, three such bolts 114 are provided. The annular ring 116 slides along an outer surface of the spindle 41 between an unlocking position, shown in FIG. 3, and a locking position, shown in FIG. 4, in response to corresponding shifting of the piston 51. A proximity detector 118, shown in FIGS. 3 and 4, for detecting the presence of the ring 116 is provided below the assembly 18 adjacent a path of travel of the ring 116. The detector 118 is electrically connected to a control circuit 104 such that the circuit 104 prohibits activation of the machine 40 when the piston 51, and thus the ring 116, are in the unlocking position.

The spindle 30 also has another substantially cylindrical bore 58 therein having an axis of elongation located parallel to and offset from the axis of elongation of the axial bore 54. A spring 60 is located in the bore 58 and is compressible between the piston 51 and a closed end 59 of the bore 58. In a preferred construction, the bore 58 extends from the stop member 52 to a point in the spindle 30 proximate to the juncture between the spindle 30 and the head portion 48. Also, the piston 51 is provided with a retention area or seat 62 for retaining an end of the spring 60. In this manner, the piston 51 is biased by the spring 60 into a locking position whereat the piston 51 is offset below the stop member 52. It is to be noted that, in the preferred construction, six bores 58, springs 60, and seats 62 are provided for spring biasing the piston 51 downwardly.

An end of the spindle 30 opposite to the end thereof connected to the head portion 48 has a stepped configuration comprising a first reduced diameter portion or step 64 and a second step 66. The first step 64 defines a terminal end of the spindle 30, and the second step 66 is connected to an end of the first step 64 opposite the terminal end of the spindle 30. It is to be noted, however, that the steps 64 and 66 do not extend the entire length of the spindle 30. The first step 64 defines an outer diameter substantially smaller than the outer diameter of the spindle 30. The second step 66 also defines a diameter smaller than the outer diameter of the spindle 30, but the diameter defined by the second step 66 is larger than the diameter defined by the first step 64.

The reduced diameter defined by the step 64 allows the first step 64 to shiftably accept a substantially cylindrical body or cam member 68 shown in FIGS. 3 and 4. The body 68 has an inner diameter slightly larger than the diameter defined by the first step 64 so that the body 68 may shift along the step 64. A boundary or shoulder between the first and second steps, 64 and 66, respectively, serves as a positive stop member 70 for limiting shifting of the body 68 by contact therewith. The cam body 68 has an outer diameter slightly smaller than the diameter defined by the second step 66, the significance of which will become clear later. Additionally, the body 68 has a sloped or tapered surface 72 on an end thereof adjacent the stop member 70. The tapered surface 72 defines an outer diameter of a portion of the body 68 which gradually decreases in size as it approaches the stop member 70. The significance of the tapered surface 72 will be discussed later.

The body 68 is intended to shift conjointly with the piston rod 56. To facilitate this conjoint shifting, the rod 56 has an enlarged integral end portion 74 on an end thereof opposite to the end connected to the piston 51. The end portion 74 has a non-threaded bore 76 therethrough for accepting a shoulder bolt 78 for attaching the body 68 to the end portion 74 on a side of the body 68 opposite to the side occupied by the tapered surface 72. The end portion 74 has an outer diameter 80 substantially equal to the outer diameter of the body 68. In addition, the end portion 74 has a tapered cam surface 82 which gradually decreases in size substantially similarly to the manner in which the diameter defined by the tapered surface 72 does.

It is important that the distance between the two tapered surfaces 72 and 82 along the rod 56 be maintained as constant as possible in order to insure proper functioning of the locking means 11. Accordingly, it is desirable to include some sort of corrective means which can allow for adjustments of the parts for insuring proper functionality of the means 11. To do this, the shoulder bolt 78 allows the body 68 to move or be adjusted limitedly with respect to the end portion 74 axially along the rod 56. The body 68 also has a bore 84 therein of dimensions sufficient to accept a spring 86 compressible between a closed end of the bore 84 and an opposing surface of the end portion 74. In this manner, the bolt 78 and the spring 86 can provide for adjustment for variances in the structure of the operative locking elements of the fixture 10, thereby insuring proper functioning thereof. This aspect of the invention will be discussed in further detail hereinbelow.

As stated above, the second step 66 has an outer diameter somewhat smaller than the outer diameter of the spindle 30. This allows the step 66 to attachably support a ball cage 88 illustrated in FIGS. 3 and 4. The cage 88 is attached to the second step 66 by means of appropriate fasteners 92, one of which being shown in FIGS. 3 and 4, extending through the cage 88 and into the step 66. In the illustrated preferred embodiment, an annular thread section 94 is located on a portion of the second step 66 matable with a complementary thread section 96 disposed on the interior of the ball cage 88. Thus, the cage 88 itself may be threadibly secured to the second step 66.

The ball cage 88 is substantially cylindrical in configuration having one closed end 90 and defining an outer diameter substantially equal to the outer diameter defined by the spindle 30. The cage 88 has a height and an inner diameter sufficient to accept the steps 64 and 66, as well as the body 68 and the end portion 74. When the cage 88 is properly attached to the second step 66, a space 98 remains between the interior of the closed end 90 and the terminal surface of the end portion 74. The space 98 is of dimensions corresponding to the dimensions of a portion of the chamber 49 between the piston 51 and the stop member 52. Accordingly, the space 98 allows the end portion 74, the rod 56, and the piston 51 to shift, with the shifting thereof being limited only by the stop member 52. This shifting actuates the locking means 11.

The cage 88 preferably carries a pair of annular sets 100A and 100B of projections or detent balls 102 variably disposed in annular sets of apertures 101A and 101B, shown in FIGS. 3, 4 and 6, in the cage 88 so that the balls 102 can move radially a limited distance in the cage 88. Two annular sets 100A and 100B are provided so as to minimize relative rocking of the assemblies 16 and 18. The balls 102 are disposed in the cage 88 so that they are gravity biased radially inwardly towards a central axis of the cage 88. Also, an annular stop member 128 defining openings having a radius less than the radius of the balls 102 is provided, only the member 128 associated with the set 100A being shown in FIG. 6, for positively retaining the balls 102 within the apertures 101A and 101B. The balls 102..are preferably located within the sets 100A and 100B every forty-five degrees along the circumference of the cage 88. The balls 102 have a radius substantially equal to a radius defined by the plurality of the annular detents 36 disposed on the interior of the cylindrical member 28 so that the balls 102 can be inserted into and engaged with the detents 36.

In the illustrated embodiment, there and two annular sets 100A and 100B offset from each other along an axis of elongation of the cage 88. The sets 100A and 100B are strategically located axially along the cage 88 at positions operatively corresponding to the locations of the tapered surfaces 72 and 82 when the cage 88 is properly joined to the second step 66. The axial distance of separation of the annular sets 100A and 100B is substantially equal to the separation distance between the surfaces 72 and 82 along the rod 56.

When the assemblies 16 and 18 are moved into the closed position, the balls 102 will be actuated by the cam surfaces 72 and 82, thereby forcing the balls 102 into the detents 36, and thereby locking the assemblies 16 and 1B together. Also, when it is desired to unlock the assemblies 16 and 18, the piston rod 56 is shifted into an extended, unlocking position, thereby shifting the body 68 and the end portion 74 with respect to the ball cage 88. This shifting causes the tapered or cam surfaces 72 and 82 to permit the balls 102 to disengage from the annular detents 36. Thus, the assemblies 16 and 18 are unlocked.

It is to be noted that the bolt 78 and the spring 86 compensate for manufacturing variances in the body 68 and the end portion 74 for insuring that the tapered surfaces 72 and 82 can be appropriately located for allowing shifting of the balls 102 radially into the cage 88 to unlock the assemblies 16 and 18. The detents 36 and the balls 102 are thusly capable of lockingly holding the assemblies 16 and 18 together in alignment within 0.003 inches or better.

With the novel structure of the fixture 10 being thusly disclosed, the function thereof will now be discussed in detail. It is to be noted that further structural limitations and details regarding the above-discussed structures may become evident or more clear with reference to the following paragraphs.

To process a tire 14 with the machine 12, the assemblies 16 and 18 must be shifted into an open position, illustrated in FIG. 1. With the assemblies 16 and 18 offset in this manner, a tire 14 of predetermined width can be inserted therebetween, as shown in phantom in FIG. 1. The tire 14 is inserted in alignment with the simulated wheel halves 26 and 42 so that the halves 26 and 42 can mimic an actual wheel when the assemblies 16 and 18 are shifted into the closed position illustrated in FIGS. 2 through 4.

It is to be noted that at this point, when the assemblies 16 and 18 are offset from one another, the piston 51, and thereby the rod 56, is shifted into- the extended or unlocking position where the balls 102 do not encounter the tapered cam surfaces 72 and 82. The balls 102 move radially inward of the cage 88 under the influence of gravity so that a surface defined by the spindle 30 and the cage 88 is substantially smooth, that is having no projections thereon which might inhibit insertion of the spindle 30 into the member 28.

The piston 51, the rod 56, the body 68 and the portion 74 are shifted from a locking position into the unlocking position in the following manner. Compressed air, or other suitable fluid, is delivered from the source 45 to the central recess or air chamber 49 through the conduit 43. Accordingly, air pressure is built up in the air chamber 50 until the piston 51 contacts and engages the stop member 52, which limits the shifting motion of the piston 51. At this point, the piston 51, as well as the associated structures, are shifted into the unlocking position described in detail hereinabove, and as shown in FIG. 3.

Once the tire 14 is properly located with respect to the halves 26 and 42, the piston 20 is activated, thereby shifting the assembly 16 downwardly on top of the assembly 18. As the assembly 16 moves down, the spindle 30 is inserted into the cylindrical member 28. As the spindle 30 enters the open end 33 of the member 28, the outer surface of the spindle 30 and the ball cage 88 are engaged by the ring 31 attached to the open end 33 of the member 28. The sliding contact between the outer surface of the spindle 30, the ball cage 88, and the ring 31 sweeps dirt, or other contaminants away from the spindle 30 and the ball cage 88. This cleans the spindle 30 and the ball cage 88, and also prevents contaminants from entering the interior of the member 28 and from interfering with shifting of the balls 102 within the cage 88.

The cleaned spindle 30 and ball cage 88 are inserted into the interior of the cylindrical member 28 a predetermined distance, as monitored by a control circuit 104, shown diagrammatically in FIGS. 1 and 2, proportional to the predetermined width of the tire 14. Specifically, the spindle 30 and the ball cage 88 are inserted into the member 28 a distance sufficient to allow the wheel halves 26 and 42 to accurately simulate an actual wheel, as shown in FIGS. 2 through 4.

Once the assembly 16 is appropriately shifted with respect to the assembly 18, as described above, the assemblies 16 and 18 are ready to be lockingly joined for processing of the tire 14. To do this, the compressed air present in the air chamber 49 is vented to atmosphere. This reduces the pressure holding the piston 51 in the unlocking position. Once this pressure has been sufficiently reduced, the spring 60 expands and forces the piston 51 downwardly away from the stop member 52. The tapered cam surfaces 72 and 82 axially move so that the larger diameter portions thereof engage the balls 102, as shown in FIG. 4. When the balls 102 are engaged by the increased diameter portions of the cam surfaces 72 and 82, the balls 102 are forced radially outward of the ball cage 88, as shown in FIG. 6. Thus, the balls 102 are shifted into engagement with the annular detents 36 disposed along the inner diameter 32 of the member 28.

Now the tire 14 can be inflated. Compressed air is introduced through the spindle 41 and into the chamber 106. The compressed air is distributed into the six radial bores 108. The air travels through the bores 108 and 110 and the openings 112 in the wheel assembly 18. The air enters the interior of the tire 14, thereby inflating it. This inflation process is continued until the tire 14 is inflated to the desired pressure.

When the tire 14 is inflated to a predetermined pressure, the tire 14 presses against the wheel halves 26 and 42 under the influence of that pressure. Because the piston 51 and the ring 116 are now in the locked position, the detector 110 senses the presence of the ring 116, and signals the circuit 104 indicating that the fixture 10 is ready for processing. The rotating machine 40 is now activated by the circuit 104, and the drive shaft 41 begins to rotate. The drive shaft 41 causes the assembly 18 to rotate, and because of the pressure-induced contact between the assemblies 16 and 18 through the tire 14, the assemblies 16 and 18 rotate conjointly. Because the recesses 36 are annular, and because the detent balls 102 are located preferably every forty-five degrees along the circumference of the ball cage 88, the assemblies 16 and 18 need not be circumferentially aligned in a particular manner in order to obtain the locking engagement between the assemblies 16 and 18 provided by the means 11. The tire 14 is now processed as desired.

Once the tire 14 has been properly processed, the rotating machine 40 stops, and the rotation of the tire 14 and the assemblies 16 and 18 ceases. The tire 14 is deflated by appropriate reversal of air travel through the bores 108 and 110. At this point, compressed air is again fed from the source 45 through the conduit 43 and into the air chamber 49. The locking means 11 shifts into the unlocking position, as described above and as shown in FIG. 3. The piston 20 shifts the assembly 16 upwardly with respect to the assembly 16, as shown in FIG. 1, and the tire 14 can now be removed. The fixture 10 and the machine 12 are ready to accept and to process another tire 14.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A tire holding fixture for holding tires for processing by a tire processing machine, comprising:

first and second wheel half support assemblies wherein one of said assemblies is shiftable between an open position for permitting insertion and removal of a tire between said assemblies and from said assemblies, respectively, and a closed position for holding said tire between said assemblies;

said first assembly including a hollow, substantially cylindrical member having an inner peripheral surface;

said second assembly including a spindle, having an outer peripheral surface, insertable into said hollow cylindrical member such that said outer peripheral surface of said second assembly is substantially concentric with respect to said inner peripheral surface of said first assembly;

a plurality of detent recesses defined within one of said surfaces and arranged within an axial array extending along said one of said surfaces;

detent means disposed upon the other one of said surfaces and movable between a first position at which said detent means engages one of said plurality of detent recesses for releasably locking said assemblies together at a predetermined axial position with respect to each other so as to hold different width tires therebetween for processing, and a second position at which said detent means disengages said one of said plurality of detent recesses so as to permit relative axial movement of said assemblies with respect to each other; and means for controlling movement of said detent means between said first and second positions when said spindle of said second assembly is disposed within said hollow cylindrical member of said first assembly.

2. A tire holding fixture as defined in claim 1, wherein:
said detent recesses are annular; and
said detent means comprises a plurality of detents circumferentially spaced around said other one of said surfaces.

3. A tire holding fixture as set forth in claim 2, wherein:
said plurality of detent means comprises a plurality of detent balls.

4. A tire holding fixture as set forth in claim 3, wherein
said plurality of detent balls are disposed within two, axially spaced circumferentially arranged arrays of said balls for engaging said annular detent recesses.

5. A tire holding fixture as set forth in claim 4, wherein:
each one of said circumferentially arranged arrays of said detent balls comprises eight detent balls circumferentially spaced with respect to each other at forty-five degree angular intervals.

6. A tire holding fixture as defined in claim 1, wherein:
said cylindrical member has an open end for permitting insertion of said spindle into said hollow cylindrical member; and
an O-ring is located upon said open end of said hollow cylindrical member for engaging and cleaning said outer surface of said spindle as said spindle is inserted into said hollow cylindrical member so that contaminants will not be carried by said outer surface of said spindle to said inner surface of said hollow cylindrical member.

7. A tire holding fixture as defined in claim 1, wherein said means for controlling movement of said detent means comprises:
an axial bore defined within said spindle; and
a piston shiftably disposed within said bore for operatively engaging and disengaging said detent means such that said detent means shifts between said detent recess engaging and disengaging positions in response to corresponding shifting of said piston within said bore of said spindle.

8. A tire holding fixture as defined in claim 7, further comprising:
spring means for biasing said piston towards said detent means engaging position.

9. A tire holding fixture as defined in claim 7, further comprising:
a pneumatic chamber operatively connected to one side of said piston for biasing said piston towards said detent means disengaging position.

10. A tire holding fixture as set forth in claim 7, wherein:
said piston comprises tapered cam surface means for engaging and disengaging said detent means.

11. A tire holding fixture as set forth in claim 1, wherein:
said plurality of detent recesses are disposed upon said inner peripheral surface of said hollow cylindrical member of said first assembly; and
said detent means are disposed upon said outer peripheral surface of said spindle of said second assembly.

12. A tire holding fixture for holding tires for processing by a tire processing machine, comprising:
a first wheel half support assembly;
a second wheel half support assembly;
one of said wheel half support assemblies being shiftable between an open position for permitting a tire to be inserted between said assemblies and be removed from said assemblies, and a closed position for holding said tire between said assemblies; and
quick release locking means for releasably locking said assemblies together at different axial positions with respect to each other so as to be able to hold tires of different widths therebetween;
said quick release locking means comprising a plurality of detent recesses arranged within an axial array extending along one of said assemblies; detent means disposed upon the other one of said assemblies and movable between a first position at which said detent means engages one of said plurality of detent recesses for releasably locking said assemblies together at a predetermined one of said axial positions, and a second position at which said detent means disengages said one of said plurality of detent recesses so as to permit relative axial movement of said assemblies with respect to each other; and means for controlling movement of said detent means between said first and second positions when said one of said assemblies is disposed at said closed position with respect to said other one of said assemblies.

13. A tire holding fixture as defined in claim 12, wherein:
said first assembly comprises an inner peripheral surface, and said second assembly comprises an outer peripheral surface wherein said outer peripheral surface is disposed radially inwardly of said inner peripheral surface when said assemblies are disposed in said closed position; and
said plurality of detent recesses are disposed upon said inner peripheral surface of said first assembly, and said detent means are disposed upon said outer peripheral surface of said second assembly 14. A tire holding fixture as defined in claim 13, wherein said means for controlling movement comprises:
an axial bore defined within said second assembly;
a piston shiftably disposed within said bore; and
a pneumatic chamber operatively connected to said piston whereby said piston is shiftably disposed within said chamber in response to fluid pressure present within said chamber;
said piston being operatively engageable with said detent means such that said detent means move between said detent recess engaging and disengaging positions in response to said shifting of said piston.

15. A tire holding fixture as set forth in claim 14, further comprising:
spring means operatively connected to said piston for moving said piston in a direction opposite to movement of said piston in response to said fluid pressure present within said chamber.

16. A tire holding fixture as defined in claim 12, wherein:
said first wheel half support assembly comprises an axially extending cylindrical member, and said second wheel half support assembly comprises a spindle extending axially into said cylindrical member when said assemblies are disposed in said closed position;

said plurality of detent recesses comprise axially spaced, annularly disposed detent recesses disposed along an inner peripheral surface of said cylindrical member of said first assembly; and said detent means comprises a plurality of radially shiftable, axially spaced detents disposed upon said spindle of said second assembly for engagement with said axially spaced detent recesses.

17. A tire holding fixture as defined in claim 16, wherein said means for controlling movement comprises:

first and second cam means axially spaced upon said spindle for respectively engaging said axially spaced detents; and means for axially moving said spindle such that said cams engage said detents for causing radial shifting of said detents into and out of engagement with said detent recesses.

18. A tire holding fixture as defined in claim 17, wherein:

said detent recesses comprise a plurality of axially spaced, annular grooves; and said detents comprise a first group of annularly spaced balls engageable within one of said grooves, and a second group of annularly spaced balls engageable within another one of said grooves.

19. A tire holding fixture as defined in claim 18 which includes means for adjusting axial spacing between said cams for promoting simultaneous actuation of the first and second group of balls.

20. A tire holding fixture as set forth in claim 18, wherein:

said first and second groups of annularly spaced balls each comprises eight detent balls circumferentially spaced with respect to each other at forty-five degree angular intervals.

* * * * *